United States Patent [19]

Bishop

[11] Patent Number: 5,230,130
[45] Date of Patent: Jul. 27, 1993

[54] METHOD OF REPAIRING DAMAGED VEHICLE HEADLIGHT ASSEMBLY

[75] Inventor: Scott S. Bishop, Indianola, Iowa
[73] Assignee: Roger Bishop, Indianola, Iowa
[21] Appl. No.: 929,288
[22] Filed: Aug. 13, 1992
[51] Int. Cl.<sup>5</sup> ............................................. B23P 6/00
[52] U.S. Cl. .......................... 29/402.04; 29/402.06; 29/402.08; 29/402.12; 156/94; 156/98
[58] Field of Search ............ 29/401.1, 402.01, 402.03, 29/402.04, 402.06, 402.08, 402.09, 402.11, 402.12, 402.14, 402.15; 156/94, 98

[56] References Cited

U.S. PATENT DOCUMENTS 2,797,967  7/1957  Irvin .......................... 29/402.08 X
3,462,144  8/1969  Griffin et al. ................ 29/402.15 X
3,509,783  5/1970  Kuhn ........................... 29/402.15 X

*Primary Examiner*—Joseph M. Gorski
*Attorney, Agent, or Firm*—Zarley, McKee, Thomte, Voorhees, & Sease

[57] ABSTRACT

The damaged adjustor mounting tab on a headlight lens assembly is repaired by cutting away a sufficient portion of the old tab to allow an L-shaped replacement adjustor tab bracket to be installed and have the adjustor block mounted in the slot of the vertical leg of the replacement bracket. Holes are drilled into the rear housing section of the lens assembly to receive mounting bolts for connecting the horizontal leg of the replacement mounting bracket.

6 Claims, 2 Drawing Sheets

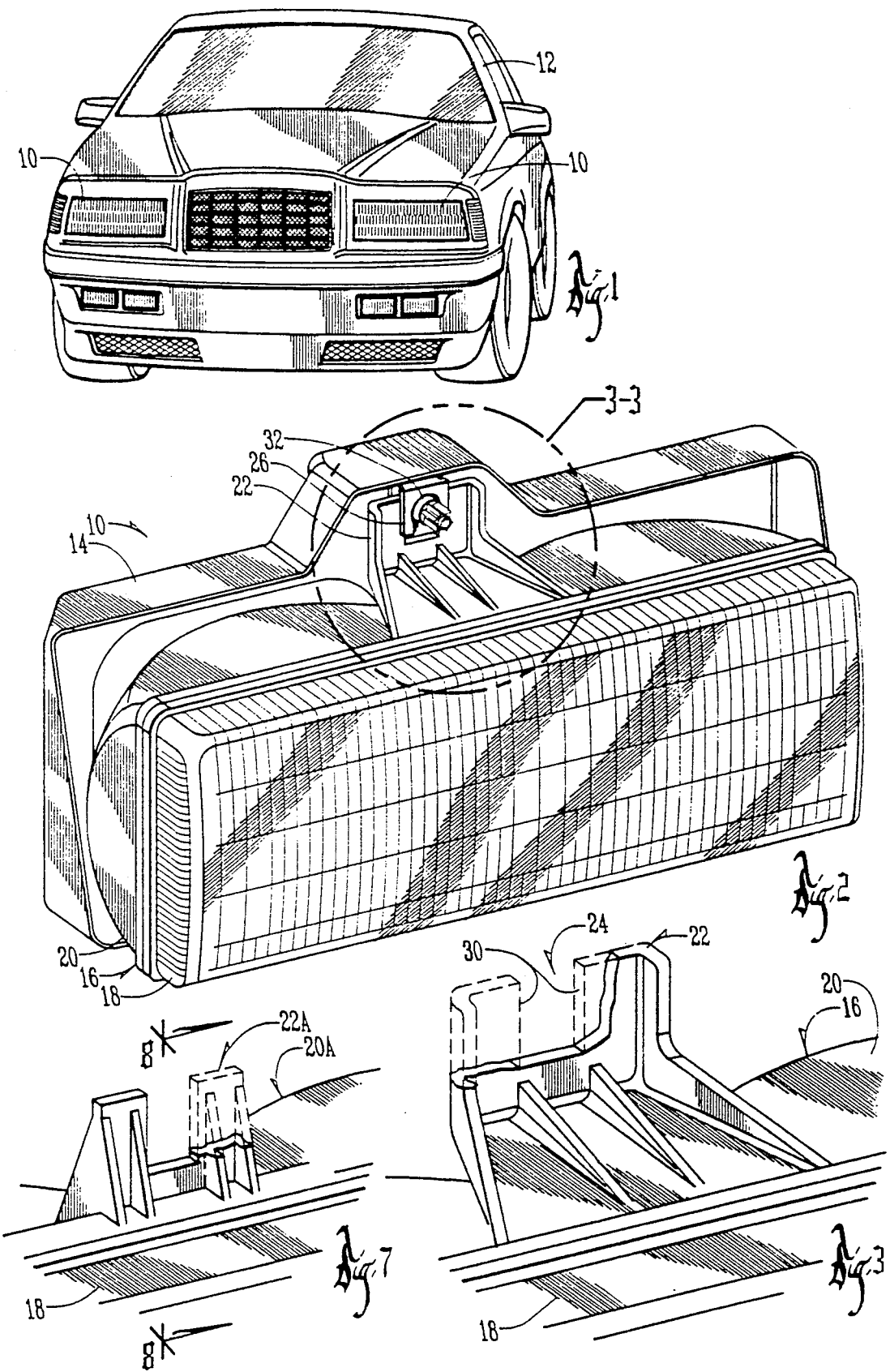

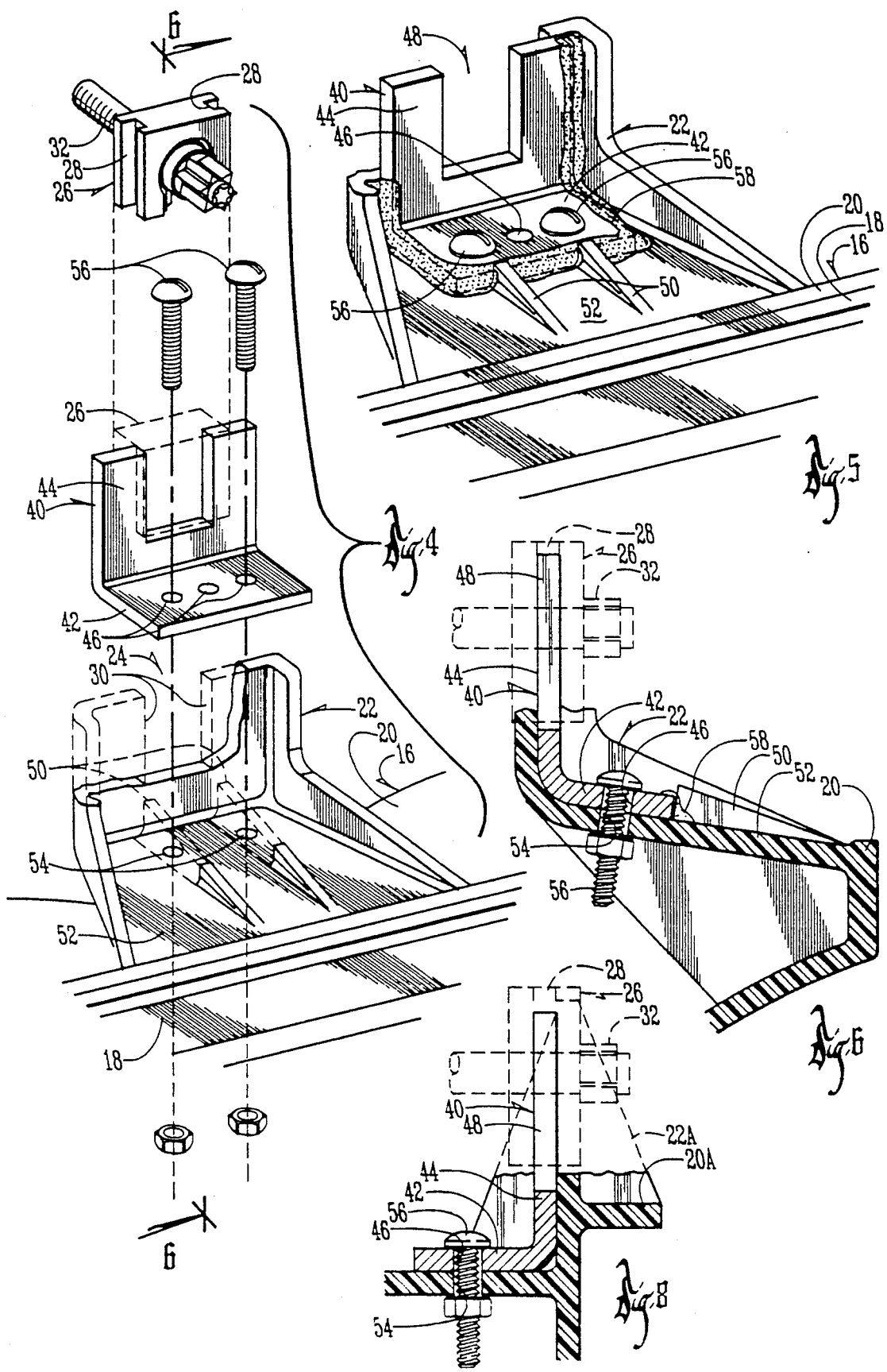

METHOD OF REPAIRING DAMAGED VEHICLE HEADLIGHT ASSEMBLY

BACKGROUND OF THE INVENTION

Vehicle body repair often involves replacing damaged parts with new parts rather than repairing the damaged items. Sometimes the cost of repair exceeds the cost of a new part replacement. Other times, however, repair of a broken part may be far less expensive and function just as well if not better than the new part. If the repaired part is in a location where it cannot be seen, the fact that it has been repaired will not be a problem from an appearance point of view.

Damage to headlight assemblies is a good example of the need for a method of repairing the top upstanding mounting tab on the lens assembly which is typically broken off or rendered inoperative when body damage involves the headlight assembly. The list price for replacement of the complete headlight assembly, as an example on some General Motors cars, ranges from $180 to $230.

Thus, what is needed is a simple and inexpensive method of repairing the upstanding mounting tab on the lens assembly so that the entire lens assembly can be reused.

SUMMARY OF THE INVENTION

The method of this invention involves cutting away, if necessary, portions of the remaining damaged upstanding mounting tab on the lens assembly such that the adjustment block may be positioned on a replacement L-shaped adjustor tab bracket which is bolted to the top side of the lens assembly. The vertical leg of the replacement bracket will be positioned in the substantial vertical plane of the original upstanding mounting tab. If portions of the original mounting tab remain, the replacement bracket ma be mounted on the front or rear side as appropriate. Holes will be drilled in the top wall of the lens assembly to receive bolts for connecting the replacement bracket to the lens assembly. The bolt fastening of the replacement bracket to the lens assembly is supplemented through the use of a suitable glue.

The repair procedures of this invention are particularly suited for the following General Motors' vehicles: 1985-90 Cadillac Deville; 1985-91 Oldsmobile Calais; 1987-90 Oldsmobile 88/98; 1986-88 Pontiac Grand Am.

DESCRIPTION OF THE DRAWINGS

FIG. 1 is a front perspective view of an automobile having a headlight assembly.

FIG. 2 is an enlarged perspective view of the headlight assembly removed from the vehicle.

FIG. 3 is a fragmentary enlarged view of the original mounting tab on the lens assembly which has been damaged as indicated by the lines 3-3 in FIG. 2.

FIG. 4 is a fragmentary exploded perspective view of the replacement adjustor tab bracket being installed on the lens assembly.

FIG. 5 is an enlarged fragmentary perspective view of the replacement adjustor tab bracket installed.

FIG. 6 is a cross sectional view taken along line 6—6 in FIG. 4 showing the replacement adjustor tab bracket installed.

FIG. 7 is an enlarged fragmentary perspective view similar to FIG. 3 but showing an alternate embodiment of the original lens assembly mounting tab.

FIG. 8 is a cross sectional view taken along line 8—8 in FIG. 7 showing the replacement adjustor tab bracket installed on the back side of the original mounting tab.

DESCRIPTION OF PREFERRED EMBODIMENT

The method of this invention involves a headlight assembly 10 in a car 12 as shown in FIGS. 1 and 2.

The headlight assembly 10 includes a rear mounting bracket 14 and a lens assembly 16. The lens assembly 16 includes a lens 18 fastened by glue to a rear housing section 20. If the lens 18 is damaged then the entire lens assembly 16 is replaced.

The rear housing section 20 includes an upstanding mounting tab 22 having a mounting slot 24 which receives an adjustor block 26 as seen in FIG. 4. The adjustor block 26 has oppositely disposed channels 28 which receive the side edges 30 of the slot 24. A bolt 32 is carried on the adjustor block 26 and is adjustably connected to the rear mounting bracket 14 (not shown).

The typically damaged portions of the original adjustor tab are indicated by the broken lines in FIGS. 3 and 4.

A replacement adjustor tab bracket 40 is seen in FIG. 4 and includes a horizontal leg 42 connected to a vertical leg 44. The horizontal leg 42 includes mounting bolt holes 46 and the vertical leg includes a vertical slot 48 to receive the adjustor block 26.

In preparation for installation of the replacement adjustor tab bracket 40, the original adjustor mounting tab 22 is cut away sufficiently to position the replacement bracket 40 including the adjustor block 26. As seen in FIG. 4 this involves cutting away the upstanding ribs 50 so that the horizontal leg 42 may be positioned flat against the top surface 52 of the housing section 20. Holes 54 are drilled into the top of the housing section 20 to receive bolts 56 which connect the bracket 40 to the lens assembly 16. Glue 58 may be used to supplement the bolt fasteners 56 and assure that there is no movement between the replacement bracket 40 and the lens assembly 16.

In the original equipment embodiment of FIGS. 1-6, the replacement bracket 40 is mounted on the front side of the original mounting tab 22 but in the embodiment of FIGS. 7 and 8 the replacement bracket 40 is mounted on the rear side of the adjustor mounting tab 22A. The original adjustment tab 22A on the rear housing section 20A as seen in FIG. 8 has the original adjustor mounting tab 22 cut away sufficiently to mount the replacement bracket 40 and adjustor block 26.

Thus it is seen in operation that a very expensive headlight assembly replacement cost can be avoided through the use of the simple and inexpensive repair kit disclosed utilizing the method of this invention.

What is claimed is:

1. A method of repairing a damaged vehicle headlight assembly including a lens assembly having a top connected to a vehicle mounting bracket by an adjustment bolt extending from the mounting bracket and having an adjustor block moveably mounted in a slot in a damaged upstanding original mounting tab on the lens assembly, comprising the steps of, providing as a replacement, an L-shaped adjustor tab bracket
   having a substantially horizontal leg and slotted vertical leg, positioning the adjustor tab bracket on the lens assembly with the slotted vertical leg in a plane parallel to the damaged upstanding mounting tab, making a connection by fastening the horizontal leg of the adjustor tab bracket to the top of the lens assembly, positioning the adjustor block in the slotted vertical leg of the adjustor tab bracket, and connecting and adjusting the headlight assembly to the vehicle mounting bracket by operating the adjustment bolt.

2. The method of claim 1 and removing sufficient portions of the damaged upstanding mounting tab, thereby allowing room for positioning and operating the adjustor block and bolt in the slotted vertical leg on the replacement adjustor tab bracket.

3. The method of claim 1 and using bolt means to make the connection.

4. The method of claim 3 and using glue as a supplement between the bolt connection of the adjustor tab bracket to the lens assembly.

5. The method of claim 1 and providing the original upstanding mounting tab with forward and rear sides and positioning the replacement adjustor tab bracket on the forward side of the original upstanding mounting tab.

6. The method of claim 1 and providing the original upstanding mounting tab with forward and rear sides and positioning the replacement adjustor tab bracket on the rear side of the original upstanding mounting tab.

* * * * *